(12) United States Patent
Marcouiller et al.

(10) Patent No.: US 10,678,002 B2
(45) Date of Patent: Jun. 9, 2020

(54) LOOP BACK CONNECTOR TO UTILIZE REVERSE DROPS IN AN INDEXING SYSTEM; AND METHODS

(71) Applicant: COMMSCOPE TECHNOLOGIES LLC, Hickory, NC (US)

(72) Inventors: Thomas Marcouiller, Shakopee, MN (US); Erik J. Gronvall, Bloomington, MN (US); Thomas A. Thigpen, Highland Village, TX (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/326,100

(22) PCT Filed: Aug. 2, 2017

(86) PCT No.: PCT/US2017/045124
§ 371 (c)(1),
(2) Date: Feb. 15, 2019

(87) PCT Pub. No.: WO2018/034848
PCT Pub. Date: Feb. 22, 2018

(65) Prior Publication Data
US 2019/0187388 A1 Jun. 20, 2019

Related U.S. Application Data

(60) Provisional application No. 62/375,636, filed on Aug. 16, 2016.

(51) Int. Cl.
*G02B 6/40* (2006.01)
*G02B 6/44* (2006.01)
(Continued)

(52) U.S. Cl.
CPC .............. *G02B 6/40* (2013.01); *G02B 6/3807* (2013.01); *G02B 6/44* (2013.01); *G02B 6/4473* (2013.01);
(Continued)

(58) Field of Classification Search
CPC .......... G02B 6/40; G02B 6/3807; H04Q 1/16; H04Q 11/0062; H04B 10/25; H04B 10/27;
(Continued)

(56) References Cited

U.S. PATENT DOCUMENTS 7,744,286 B2  6/2010  Lu et al.
7,744,288 B2  6/2010  Lu et al.
(Continued)

FOREIGN PATENT DOCUMENTS

EP   1 981 185 A1   10/2008
JP   H10-32545 A    2/1998
(Continued)

OTHER PUBLICATIONS

International Search Report and Written Opinion of the International Searching Authority for International Patent Application No. PCT/US2017/045124 dated Nov. 8, 2017, 8 pages.

*Primary Examiner* — John Bedtelyon
(74) *Attorney, Agent, or Firm* — Merchant & Gould P.C.

(57) ABSTRACT

Aspects and techniques of the present disclosure relate to a fiber optic communications network that includes a loop back connector in conjunction with one or more distribution devices daisy chained together to index optical fibers within the network. The network includes a central office that sends signals in one direction. The loop back connector can be mounted at the end of the chain to allow un-used live indexing optical fibers corresponding to active fiber positions to be looped back to feed signals to dead indexing (Continued)

optical fibers corresponding to inactive fiber positions. The dead indexing optical fibers can be optically connected to progressively dropped fibers or reverse ports in the indexed network.

4 Claims, 3 Drawing Sheets

(51) Int. Cl.
    *G02B 6/38*      (2006.01)
    *H04Q 11/00*      (2006.01)
    *H04Q 1/16*      (2006.01)

(52) U.S. Cl.
    CPC ........... *H04Q 11/00* (2013.01); *G02B 6/3885* (2013.01); *G02B 6/3897* (2013.01); *H04Q 1/16* (2013.01)

(58) Field of Classification Search
    CPC . H04B 10/0062; H04B 10/035; H04B 17/408
    See application file for complete search history.

(56) References Cited

U.S. PATENT DOCUMENTS

| | | | |
|---|---|---|---|
| 7,762,726 | B2 | 7/2010 | Lu et al. |
| 7,942,590 | B2 | 5/2011 | Lu et al. |
| 7,959,361 | B2 | 6/2011 | Lu et al. |
| 8,036,504 | B2 | 10/2011 | Lu |
| 9,207,421 | B2 | 12/2015 | Conner |
| 9,348,096 | B2 | 5/2016 | Kmit et al. |
| 9,557,498 | B2 | 1/2017 | Loeffelholz |
| 9,874,713 | B2 | 1/2018 | Marcouiller et al. |
| 2009/0269054 | A1* | 10/2009 | Smith .................. H04B 10/073 398/25 |
| 2014/0254986 | A1* | 9/2014 | Kmit .................. H04Q 11/0067 385/55 |
| 2015/0055954 | A1 | 2/2015 | Gronvall et al. |
| 2015/0137398 | A1 | 5/2015 | Perez |
| 2015/0378112 | A1 | 12/2015 | Marcouiller et al. |

FOREIGN PATENT DOCUMENTS

| | | |
|---|---|---|
| WO | 2013/149150 A1 | 10/2013 |
| WO | 2014/190281 A1 | 11/2014 |
| WO | 2015/200826 A1 | 12/2015 |
| WO | 2016/057411 A1 | 4/2016 |
| WO | 2016/132216 A1 | 8/2016 |
| WO | 2016/137934 A1 | 9/2016 |
| WO | 2017/132388 A1 | 8/2017 |

* cited by examiner

US 10,678,002 B2

LOOP BACK CONNECTOR TO UTILIZE REVERSE DROPS IN AN INDEXING SYSTEM; AND METHODS

CROSS-REFERENCE TO RELATED APPLICATION

This application is a National Stage Application of PCT/US2017/045124, filed on Aug. 2, 2017, which claims the benefit of U.S. Patent Application Ser. No. 62/375,636, filed on Aug. 16, 2016, the disclosures of which are incorporated herein by reference in their entireties. To the extent appropriate, a claim of priority is made to each of the above disclosed applications.

TECHNICAL FIELD

The present disclosure relates generally to fiber optic cable networks. More specifically, the present disclosure relates to termination of fiber optic cables.

BACKGROUND

Passive optical networks are becoming prevalent in part because service providers want to deliver high bandwidth communication capabilities to customers. Passive optical networks are a desirable choice for delivering high-speed communication data because they may not employ active electronic devices, such as amplifiers and repeaters, between a central office and a subscriber termination. The absence of active electronic devices may decrease network complexity and/or cost and may increase network reliability.

SUMMARY

A loop back connector used in an indexing terminal and features thereof are described. One aspect of the present disclosure relates to a telecommunications cable distribution architecture. The architecture may include a plurality of indexing components each having a first multi-fiber connection interface that defines a plurality of sequential fiber positions and a second multi-fiber connection interface that defines a plurality of sequential fiber positions. The architecture may further include a plurality of indexing optical fibers connected between the first and second multi-fiber connection interfaces in an indexed configuration. A forward drop fiber may be routed from the first multi-fiber connection interface to a forward drop location and a reverse drop fiber may be routed from the second multi-fiber connection location to a reverse drop location. The indexing components may be daisy chained together end-to-end in an upstream to downstream direction with the first multi-fiber connection interface of each indexing component being positioned upstream from its corresponding second multi-fiber connection location. The first and second multi-fiber connection interfaces of adjacent indexing components in the daisy chain may be optically coupled together. The second multi-fiber connection interface of the downstream-most indexing component may be mated with a loop-back connector that optically connects an active plurality of fiber positions of the second multi-fiber connection interface with an inactive plurality of fiber positions of the second multi-fiber connection interface such that signals can be routed from live indexing optical fibers corresponding to the active fiber positions to dead indexing optical fibers corresponding to the inactive fiber positions. The dead indexing optical fibers may be optically connected to the reverse drop fibers.

Another aspect of the present disclosure relates to a method for utilizing reverse drop locations in an indexing network. The method includes a step of installing a loop back connector downstream of the indexing network to loop signals back and utilize reverse drops.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

The present disclosure relates to a fiber optic communications network that includes a loop back connector in conjunction with one or more distribution devices daisy chained together to index optical fibers within the network. The network includes a central office that sends signals in one direction (e.g., a forward direction). The loop back connector can be mounted at the end of the chain to allow un-used live indexing optical fibers corresponding to active fiber positions to be looped back (e.g., redirected) to feed signals to dead indexing optical fibers corresponding to inactive fiber positions. The dead indexing optical fibers can be optically connected to progressively dropped fibers or reverse ports in the indexed network. An example fiber indexing system and method for deploying a fiber optic network architecture is shown in U.S. Pat. No. 9,348,096, the disclosure of which is hereby incorporated herein by reference.

Figure 1:
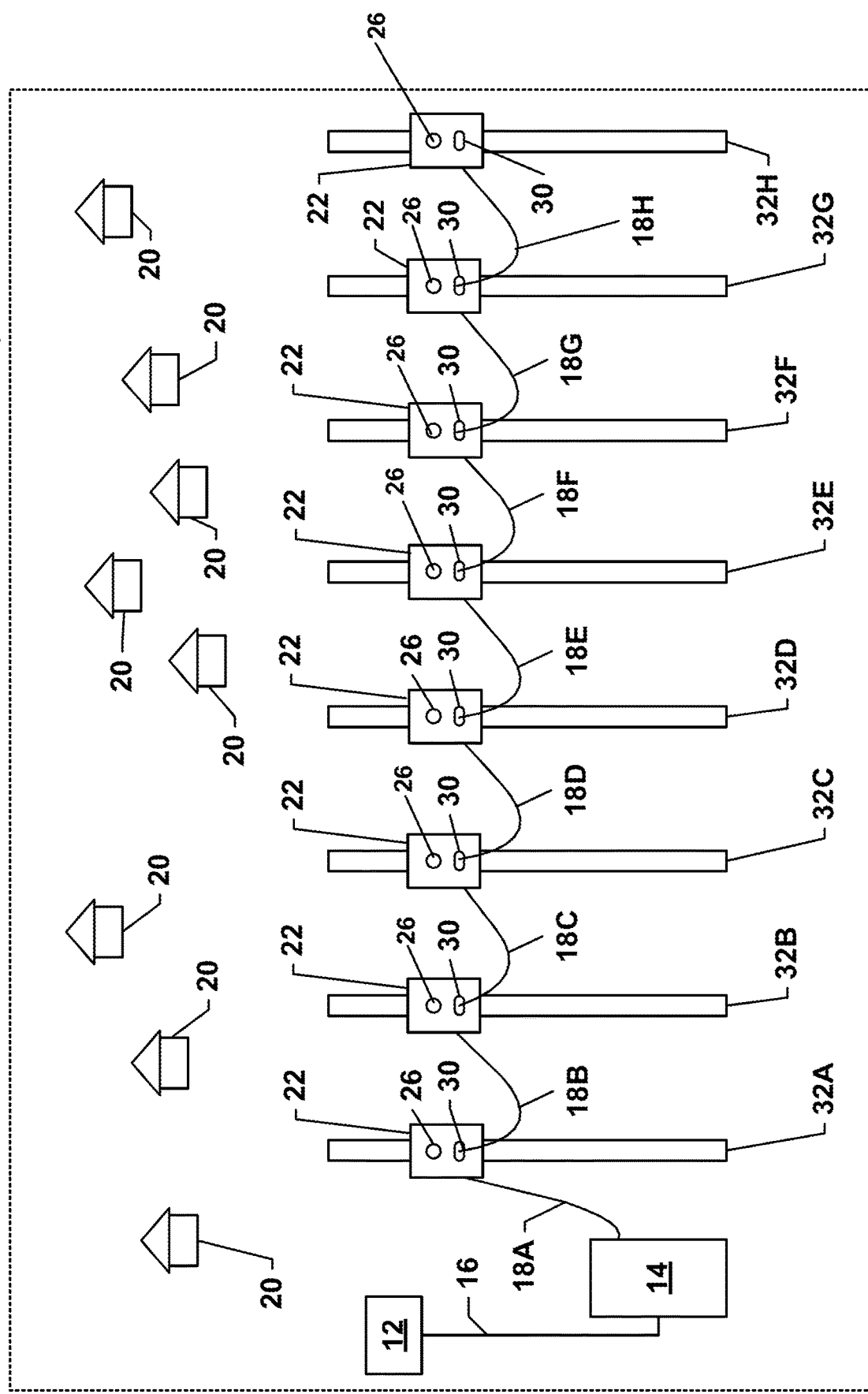
FIG. 1 is a schematic diagram of an example distributed optical network including indexing terminals daisy-chained together.

FIG. 1 illustrates an example optical network 10 being deployed in accordance with the principles of the present disclosure. The example optical network 10 includes a central office 12 and at least one fiber distribution hub 14. While only a single hub 14 is shown in FIG. 1, it will be understood that optical networks 10 typically include multiple hubs. At least one feeder cable 16 extends from the central office 12 to each distribution hub 14. At the distribution hub 14, optical fiber carried by the feeder cable 16 are split onto optical fibers of one or more distribution cables 18. At least one distribution cable 18 extends from the distribution hub 14 towards subscriber premises 20.

In accordance with some aspects, the optical network 10 is a distributed optical network in which optical signals may be split at a splitting location disposed between the distribution hub 14 and the individual subscriber premises 20 as will be disclosed in more detail herein. In such systems, individual optical fibers may be broken out from the distribution cable 18 at geographic intervals and routed to the splitting locations. In various implementations, the splitting locations may be positioned at telephone poles, strands, and/or hand holes. From the splitting locations, the split optical signals are carried by drop cables to the individual subscriber premises 20.

In some implementations, the individual optical fibers are broken out from the distribution cable 18 at indexing terminals 22. Each indexing terminal 22 receives a distribution cable 18 having two or more optical fibers. In some implementations, the distribution cable 18 is a stub cable that extends outwardly from the indexing terminal 22. In other implementations, the indexing terminal 22 receives a connectorized end of the distribution cable 18. In certain implementations, each indexing terminal 22 separates one of the optical fibers from other optical fibers 24 (see FIG. 2) of the distribution cable 18. The separated optical fiber 24 is routed to a first port 26 of the indexing terminal 22 and the other optical fibers 28 are routed to a second port 30 of the indexing terminal 22 (e.g., see FIG. 2). A dead indexing optical fiber corresponding to an inactive fiber position P12' may also be routed from the second port 30 such that the dead indexing optical fiber may be optically connected to a reverse drop fiber 21 at a reverse drop location 23. Details of an example connection would be described below with reference to FIG. 3.

In the example shown in FIG. 1, a first distribution cable 18A is routed from the distribution hub 14 to a mounting structure (e.g., telephone pole) 32A at which the indexing terminal 22 is mounted. A second distribution cable 18B extends from the indexing terminal 22 at the first mounting structure 32A to another indexing terminal mounted at a second mounting structure 32B. In the distributed network 10 shown in FIG. 1, indexing terminals 22 are mounted to eight poles 32A-32H. These indexing terminals 22 are daisy-chained together using distribution cables 18A-18H as will be described in more detail herein. In other implementations, however, distributed networks may include a greater or lesser number of indexing terminals 22.

Figure 2:
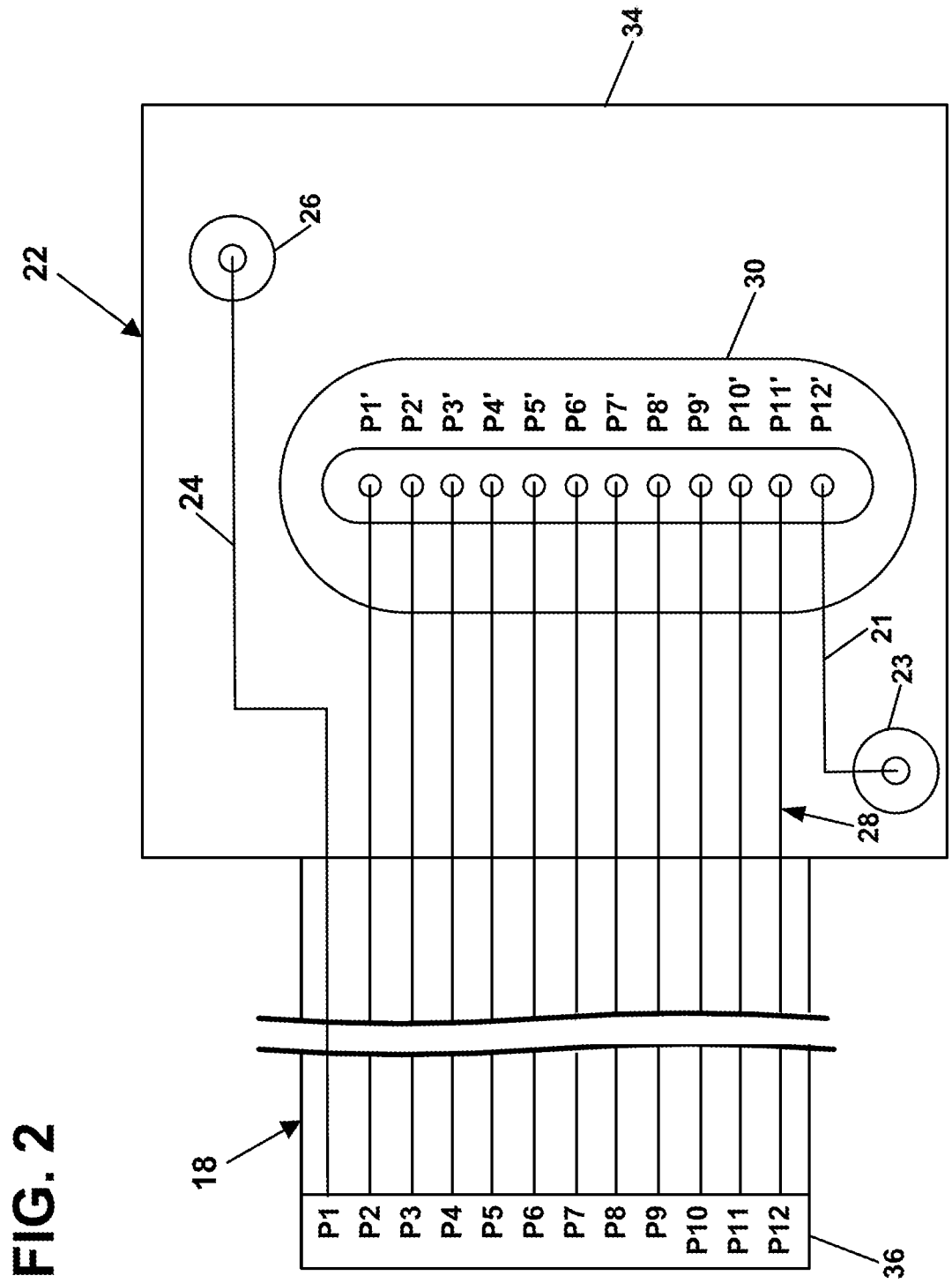
FIG. 2 is a schematic diagram of an example indexing terminal suitable for use in the distributed optical network of FIG. 1.

FIG. 2 illustrates an example indexing terminal 22 suitable for use in the distributed optical network 10 of FIG. 1. The indexing terminal 22 includes a housing 34 that defines the first port 26 and the second port 30. In the example shown, the stub distribution cable 18 extends outwardly from the indexing terminal housing 22. The stub distribution cable 18 includes multiple optical fibers that are connectorized at an end opposite the indexing terminal housing 34. In the example shown, the stub distribution cable 18 includes twelve optical fibers. In other implementations, however, the stub distribution cable 18 may include a greater or lesser number of optical fibers (e.g., four, six, eight, ten, sixteen, twenty-four, seventy-two, etc.).

In certain implementations, the optical fibers of the stub distribution cable 18 extend from first ends to a second ends. The first ends of the fibers are connectorized at a multi-fiber connector 36 (e.g., an MPO-type connector). In the example shown, the first ends of the fibers are connectorized at a ruggedized multi-fiber connector (e.g., an HMFOC-connector). As the terms are used herein, ruggedized optical connectors and ruggedized optical adapters are configured to mate together to form an environmental seal. Some non-limiting example ruggedized optical connector interfaces suitable for use with an indexing terminal 22 are disclosed in U.S. Pat. Nos. 7,744,288, 7,762,726, 7,744,286, 7,942,590, and 7,959,361, the disclosures of which are hereby incorporated herein by reference.

The connector 36 indexes the first end of each optical fiber at a particular position relative to the other fibers. In the example shown, the connector 36 indexes each of the twelve optical fibers into one of twelve positions P1-P12. The second port 30 has the same number of fiber positions as the connector 36. In the example shown, the second port 30 has twelve fiber positions P1'-P12' that correspond with the fiber positions P1-P12 of the connector 36. However, at least one of the fiber positions at the second port 30 does not receive an optical fiber as will be disclosed in more detail herein.

In one example, a first one 24 of the optical fibers has a first end located at the first position P1 of the connector 36. The second end of the first optical fiber 24 is separated out from the rest of the optical fibers 28 within the indexing terminal housing 34 and routed to the first port 26 at which optical signals carried by the first optical fiber 24 may be accessed. In some implementations, the first port 26 defines a female port at which an optical fiber plug may be mated to the first optical fiber 24 as will be described in more detail herein. In certain implementations, the first port 26 includes a ruggedized (i.e., hardened) optical adapter configured to receive a ruggedized optical connector (e.g., an HMFOC).

The remaining optical fibers 28 are routed to the second port 30. At least one of the fiber positions P1'-P12' does not receive an optical fiber 28 since at least one optical fiber 24 is diverted to the first port 26. However, the second port 30 indexes the received optical fibers 28 so that a first position P1' at the second port 30 that corresponds with the first position P1 of the connector 36 does receive one of the optical fibers 28. In accordance with aspects of the disclosure, when the indexing terminals 22 are daisy-chained together as shown in FIG. 1, the optical fiber 24 diverted to the first port 26 will be pulled from the same position P1-P12. Also, the remaining fibers 28 will be cabled so that the corresponding position P1'-P12' at the second port 30 will receive one of the optical fibers 28 if any are available.

In the example shown, the separated optical fiber 24 is located at an end of the row/strip of fibers. Accordingly, the optical fibers 28 are cabled within the indexing terminal housing 34 to divert the second end of each optical fiber 28 over one indexed position P1'-P12' compared to the first end. For example, a fiber 28 having a first end at position Pn of the connector 36 would have a second end at position P(n−1)' at the second port 30. In the example shown, the optical fiber 28 having a first end at the second position P2 of the connector 36 will have a second end disposed at the first position P1' of the second port 30. Likewise, the optical fiber 28 having a first end at disposed the third position P3 of the connector 36 will have a second end disposed at the second position P2' of the second port 30. The optical fiber 28 having a first end at the twelfth position P12 of the connector 36 will have a second end disposed at the eleventh position P11' of the second port 30. The twelfth position P12' of the second port 30 will not receive an optical fiber. In other implementations, the optical fiber at any of the positions P1-P12 may be separated out from the rest as long as each indexing terminal separates out a fiber from the same position. It will be appreciated that the second end of each optical fiber 28 can be diverted over more than one indexed position P1'-P12' compared to the first end in a repeated pattern.

Such a cabling configuration enables the indexing terminals to be daisy-chained together using identical components while always delivering the next fiber in line to the first port 26. For example, in FIG. 1, the stub distribution cable 18B of the second indexing terminal 22 mounted to the second pole 32B may be routed to and plugged into the second port 30 of the first indexing terminal 22 mounted to the first pole 32A. The stub distribution cable 18A of the first indexing terminal 22 may be routed to the distribution hub 14 to receive split optical signals from the feeder cable 16. Accordingly, the split optical signals carried by the first optical fiber 24 of the first stub distribution cable 18A are routed to the first port 26 of the first indexing terminal 22.

The split optical signals carried by the remaining optical fibers 28 of the first stub distribution cable 18A are routed to positions P1'-P11' of the second port 30 of the first indexing terminal 22.

At the second port 30, the second optical fiber 28 of the first stub cable 18A is mated with the first optical fiber 24 of the second stub cable 18B. The first optical fiber 24 of the second stub cable 18B is routed to the first port 26 of the second indexing terminal. Accordingly, the split optical signals carried by the second optical fiber 28 of the first stub cable 18A propagate to the first optical fiber 24 of the second stub cable 18B and are accessible at the second port 30 of the second indexing terminal 22. Likewise, the split optical signals carried by the sixth optical fiber 28 of the first stub cable 18A propagate to the fifth optical fiber 24 of the second stub cable 18B, the fourth optical fiber 28 of the third stub cable 18C, the third optical fiber 28 of the fourth stub cable 18D, the second optical fiber 28 of the fifth stub cable 18E, and the first optical fiber 24 of the sixth stub cable 18F and are accessible at the second port 30 of the sixth indexing terminal 22.

In alternative implementations, the distribution cable 18 is not a stub cable and the indexing terminal housing 38 defines an input port (e.g., an HMFOC port) configured to receive a second connectorized end of the distribution cable 18. In such implementations, internal cabling between the input port and the second port 30 is implemented as described above. Accordingly, the optical fiber coupled to a first position at the input port is routed to the first port 26 and the optical fiber coupled to a second position at the input port is routed to a first position at the second port 30. In such implementations, each distribution cables 18 would include twelve optical fibers that are connectorized at both ends. The first end of each distribution cable 18 would mate with the input port of one indexing terminal. The second end of each distribution cable 18 would mate with the second port 30 of another indexing terminal.

Figure 3:
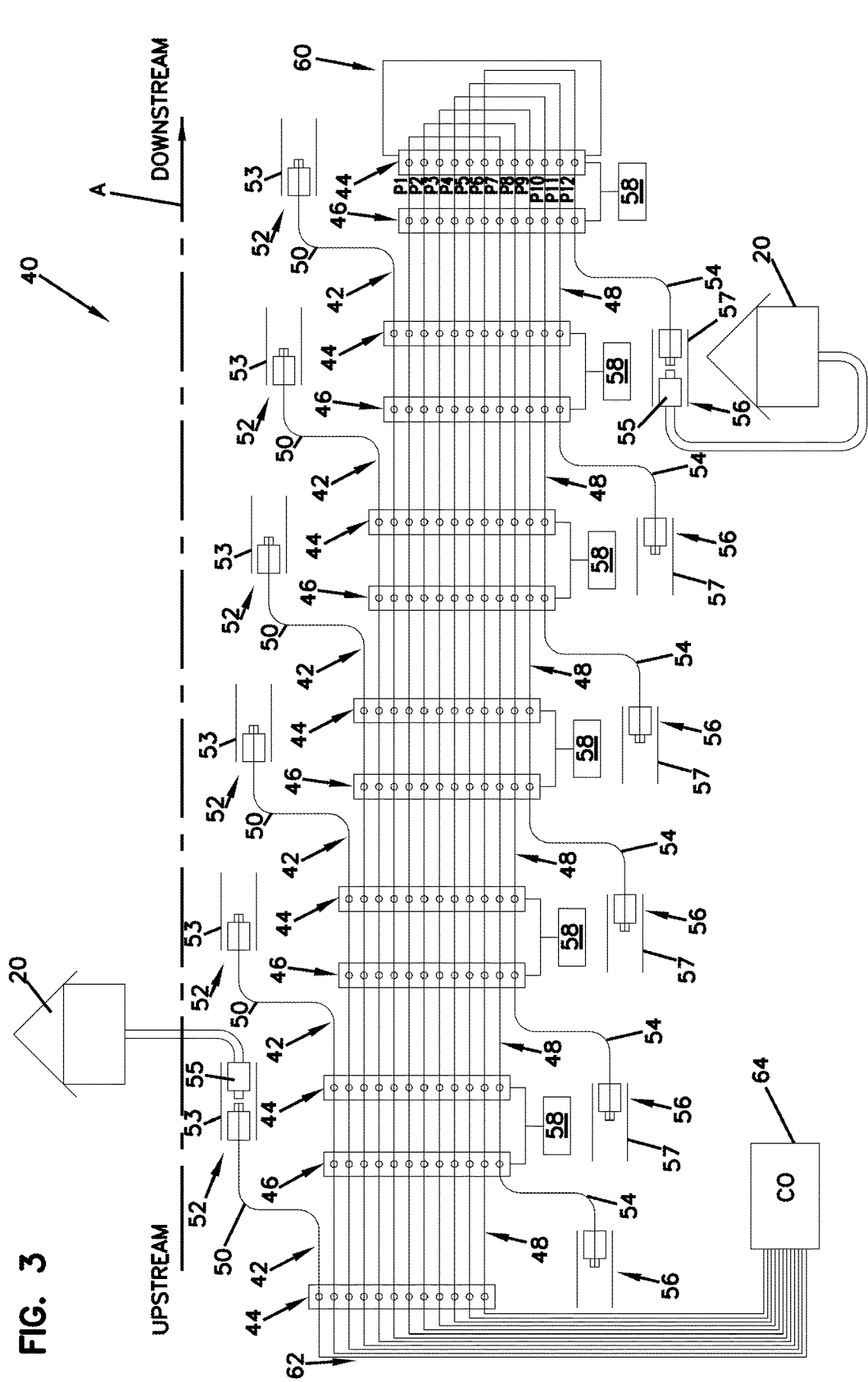
FIG. 3 is a schematic diagram of an example telecommunications cable distribution architecture in accordance with principles of the present disclosure.

Referring to FIG. 3, an example telecommunications cable distribution architecture 40 is shown. The telecommunications cable distribution architecture 40 can include a plurality of indexing components 42. Each one of the plurality of indexing components 42 can include a first multi-fiber connection interface 44 defining a plurality of sequential fiber positions and a second multi-fiber connection interface 46 defining a plurality of sequential fiber positions.

The telecommunications cable distribution architecture 40 further includes a plurality of indexing optical fibers 48 connected between the first and second multi-fiber connection interfaces 44, 46 in an indexed configuration. A feeder distribution cable 62 (e.g., main cable) may be associated at one end with a central office 64. The cable 62 may have on the order of 12 to 48 fibers; however, alternative implementations may include fewer or more fibers. The cable 62 shown has 12 fibers that each have an end associated with the central office 64. The central office 64 may connect a number of end subscribers 20 (e.g., end users). In certain examples, the central office 64 may also connect to a larger network such as the Internet (not shown) and a public switched telephone network (PSTN). The various lines of the network can be aerial or housed within underground conduits.

In certain examples, forward drop fibers 50 may be routed from the first multi-fiber connection interfaces 44 of indexing components 42 in the architecture 40 to forward drop locations 52 where they are connected into adapter ports 53. As shown, a second connector 55 may be plugged or connected into the adapter ports 53 and routed to the individual subscriber premises 20.

The plurality of indexing components 42 can be daisy chained together end-to-end in an upstream to downstream direction as shown by arrow A with first multi-fiber connection interfaces 44 of each indexing component 42 being positioned upstream from its corresponding second multi-fiber connection interface 46. The first and second multi-fiber connection interfaces 44, 46 of adjacent indexing components 42 in the daisy chain can be optically coupled together. In FIG. 3, a mechanical coupling 58 is schematically shown to indicate the coupling of the first and second multi-fiber connection interfaces 44, 46 of adjacent indexing components 42 in the daisy chain.

The second multi-fiber connection interface 46 of the downstream-most indexing component 42 can be mated with a loop-back connector 60 that optically connects an active plurality of sequential fiber positions P1-P6 of the second multi-fiber connection interface 46 with an inactive plurality of sequential fiber positions P7-P12 of the second multi-fiber connection interface 46 such that signals can be routed from live indexing optical fibers corresponding to the active fiber positions P1-P6 to dead indexing optical fibers corresponding to the inactive fiber positions P7-P12.

For example, a signal from a live indexing optical fiber corresponding to the active fiber position P1 may be routed to a dead indexing optical fiber corresponding to the inactive fiber position P7. Likewise, a signal from a live indexing optical fiber corresponding to the active fiber position P2 may be routed to a dead indexing optical fiber corresponding to the inactive fiber position P8. A signal from a live indexing optical fiber corresponding to the active fiber position P3 may be routed to a dead indexing optical fiber corresponding to the inactive fiber position P9. A signal from a live indexing optical fiber corresponding to the active fiber position P4 may be routed to a dead indexing optical fiber corresponding to the inactive fiber position P10. A signal from a live indexing optical fiber corresponding to the active fiber position P5 may be routed to a dead indexing optical fiber corresponding to the inactive fiber position P11. A signal from a live indexing optical fiber corresponding to the active fiber position P6 may be routed to a dead indexing optical fiber corresponding to the inactive fiber position P12.

Reverse drop fibers 54 may also be routed from the second multi-fiber connection interfaces 46 of the indexing components 42 in the architecture 40 to reverse drop locations 56 where they can be connected into adapter ports 57. A second connector 55 may be plugged or connected into the adapter ports 57 and routed to the individual subscriber premises 20. Accordingly, the dead indexing optical fibers P7-P12 may be optically connected to the reverse drop fibers 54.

The principles, techniques, and features described herein can be applied in a variety of systems, and there is no requirement that all of the advantageous features identified be incorporated in an assembly, system or component to obtain some benefit according to the present disclosure.

From the forgoing detailed description, it will be evident that modifications and variations can be made without departing from the spirit and scope of the disclosure.

What is claimed is:
1. A telecommunications cable distribution architecture comprising:
    a plurality of indexing components each including:
        a first multi-fiber connection interface defining a plurality of sequential fiber positions;

a second multi-fiber connection interface defining a plurality of sequential fiber positions;
a plurality of indexing optical fibers connected between the first and second multi-fiber connection interfaces in an indexed configuration;
a forward drop fiber routed from the first multi-fiber connection interface to a forward drop location; and
a reverse drop fiber routed from the second multi-fiber connection interface to a reverse drop location;

the indexing components being daisy chained together end-to-end in an upstream to downstream direction with the first multi-fiber connection interface of each indexing component being positioned upstream from its corresponding second multi-fiber connection interface, the first and second multi-fiber connection interfaces of adjacent indexing components in the daisy chain being optically coupled together; and the second multi-fiber connection interface of the downstream-most indexing component being mated with a loop-back connector that optically connects an active plurality of fiber positions of the second multi-fiber connection interface with an inactive plurality of fiber positions of the second multi-fiber connection interface such that signals can be routed from live indexing optical fibers corresponding to the active fiber positions to dead indexing optical fibers corresponding to the inactive fiber positions, and wherein the dead indexing optical fibers are optically connected to the reverse drop fibers.

2. The telecommunications cable distribution architecture of claim 1, wherein the indexing components are hardened connectors.

3. The telecommunications cable distribution architecture of claim 1, wherein the plurality of sequential fiber positions includes at least 6 sequential fiber positions.

4. The telecommunications cable distribution architecture of claim 1, wherein the plurality of sequential fiber positions includes at least 12 sequential fiber positions.

* * * * *